United States Patent
Yin et al.

(10) Patent No.: US 7,254,015 B2
(45) Date of Patent: Aug. 7, 2007

(54) MULTI-FUNCTIONAL DEVICE FOR A COMPUTER

(75) Inventors: Memphis-Zhihong Yin, Tomball, TX (US); Cary J. Hoffer, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 10/758,380

(22) Filed: Jan. 15, 2004

(65) Prior Publication Data

US 2005/0157458 A1 Jul. 21, 2005

(51) Int. Cl.
*G06F 1/16* (2006.01)
(52) U.S. Cl. .......................... 361/683; 361/681
(58) Field of Classification Search ................ 361/683, 361/686, 693, 681
See application file for complete search history.

(56) References Cited

U.S. PATENT DOCUMENTS

| | | | |
|---|---|---|---|
| 5,689,654 A * | 11/1997 | Kikinis et al. .............. 710/303 |
| 5,740,012 A * | 4/1998 | Choi .......................... 361/686 |
| 5,768,163 A * | 6/1998 | Smith, II .................... 708/105 |
| 5,801,919 A | 9/1998 | Griencewic | |
| 6,118,653 A * | 9/2000 | Kim .......................... 361/683 |
| 6,141,052 A * | 10/2000 | Fukumitsu et al. ......... 348/373 |
| 6,538,880 B1 * | 3/2003 | Kamijo et al. .............. 361/686 |
| 6,587,151 B1 * | 7/2003 | Cipolla et al. .............. 348/373 |
| 6,798,647 B2 * | 9/2004 | Dickie ........................ 361/683 |
| 6,812,958 B1 * | 11/2004 | Silvester .................. 348/207.1 |
| 6,914,594 B2 * | 7/2005 | Chuang ...................... 345/169 |
| 7,014,484 B2 * | 3/2006 | Hagiwara ................... 439/159 |
| 7,054,965 B2 * | 5/2006 | Bell et al. ..................... 710/72 |
| 2002/0008497 A1 * | 1/2002 | Tanaka et al. .............. 320/128 |
| 2002/0178343 A1 * | 11/2002 | Tsai et al. ...................... 712/1 |
| 2003/0095379 A1 * | 5/2003 | Fujiki et al. ................ 361/686 |
| 2004/0198443 A1 * | 10/2004 | Miyasaka ................... 455/557 |
| 2004/0233628 A1 * | 11/2004 | Homer et al. ............... 361/683 |

* cited by examiner

*Primary Examiner*—Jayprakash Gandhi
*Assistant Examiner*—Ingrid Wright

(57) ABSTRACT

A multi-functional device for a computer has a first set of functions when the multi-functional device is inserted into the computer and a second set of functions when removed from the computer.

20 Claims, 10 Drawing Sheets

MULTI-FUNCTIONAL DEVICE FOR A COMPUTER

BACKGROUND OF THE INVENTION

Storage and entertainment devices include video players, DVD players, VCRs, audio players, MP3 players, CD players, radios, tape players, video recorders, cameras, audio recorders, computers, personal digital assistants and televisions, among many others. Some "stand-alone" devices can be connected to a computer system for uploading and/or downloading of content (e.g. entertainment, software, games, data, images, audio, video, etc.) to be played by the stand-alone devices or by the computer system. A cable makes the physical connection between the stand-alone device and the computer system. The stand-alone device, thus, is kept external to the computer system.

Since the stand-alone device is external to the computer system, the stand-alone device occupies a portion of a user's limited workspace. Furthermore, the length of the cable may limit placement of the stand-alone device with respect to the computer. Additionally, when carried with a notebook computer, the stand-alone device and cable are additional items that the user must carry. Carrying the stand-alone device and the cable may be cumbersome, especially if space is limited in a carrying case.

Some computer systems have a built-in storage or entertainment device, such as a CD/DVD player or TV tuner. Thus, the inconvenience of having to make room for and keep up with a separate item is avoided. However, the size and portability advantages of using a compact, stand-alone, lightweight device are lost.

SUMMARY OF THE INVENTION

According to a particular embodiment of the present invention, a computer comprises an internal device bay and a multi-functional device. An electrical connector is disposed in the internal device bay. The multi-functional device is insertable in the internal device bay and connectable to the electrical connector. The multi-functional device has a first set of functions when the multi-functional device is inserted into the internal device bay and connected to the electrical connector and a second set of functions when removed from the internal device bay.

According to another embodiment of the present invention, a multi-functional device comprises a body and a mating electrical connector. The multi-functional device can be connected to a personal electronic system having an internal device bay and an electrical connector accessible within the internal device bay. The body is insertable at least partially into the internal device bay of the personal electronic system. The mating electrical connector is adapted to connect to the electrical connector of the personal electronic system upon inserting the multi-functional device into the internal device bay. The multi-functional device operates in a first functional capacity when inserted at least partially into the internal device bay and connected to the electrical connector. The multi-functional device operates in a second functional capacity when removed from the personal electronic system.

According to yet another embodiment, a method for using a multi-functional device comprises electrically connecting the multi-functional device to a personal electronic system by inserting the multi-functional device at least partially into an internal device bay of the personal electronic system, operating the multi-functional device in a first functional capacity when the multi-functional device is inserted in the internal device bay of the personal electronic system, electrically disconnecting the device from the personal electronic system by removing the device from the internal device bay of the personal electronic system, and operating the multi-functional device in a second functional capacity when the multi-functional device is removed from the personal electronic system.

DETAILED DESCRIPTION

Figure 1:
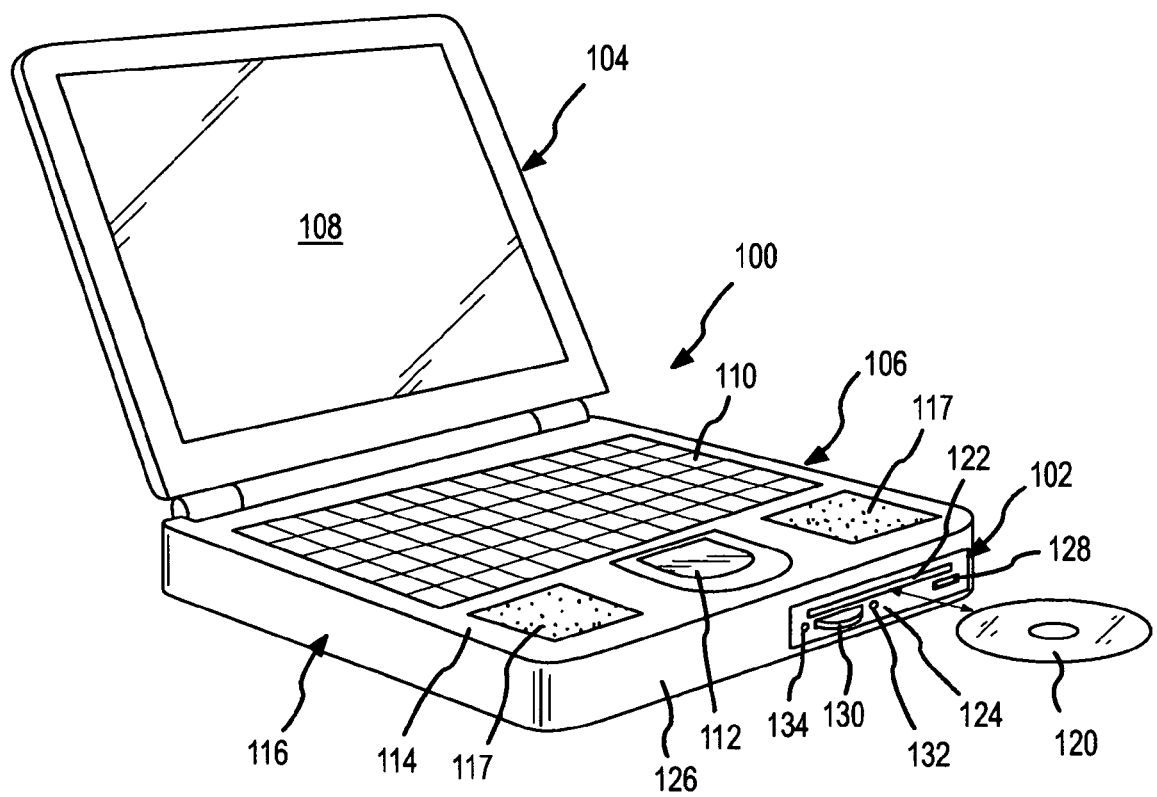
FIG. 1 is a perspective view of a computer system and an multi-functional device incorporating an embodiment of the present invention.

An exemplary computer system 100 and an exemplary multi-functional storage, computer and/or entertainment device 102 inserted in the computer system 100 and incorporating an embodiment of the present invention are shown in FIG. 1. Although the computer system 100 is shown as a notebook PC, the invention is not so limited, but may be any type of computer system or personal electronic system that may be used to play, store or transfer content, such as a notebook PC, a desktop PC, a computer server, a mainframe computer, a palmtop computer, a personal digital assistant (PDA), a video gaming system, an audio/video player, a television, a home entertainment system, etc. The multi-functional device 102 may be any type of electronic device that stores, operates, plays or otherwise uses content, such as entertainment, software, games, data, images, audio, video, etc. Thus, the multi-functional device 102 may be a video player, a DVD player, a VCR, an audio player, an MP3 player, a CD player, a radio, a tape player, a video recorder, a still image camera, a video camera, an audio recorder, a computer, a personal digital assistant, a phone, a game player or a television, among many other electronic devices.

The computer system 100 includes a display section 104 and a base section 106. The display section 104 includes a display screen 108. The base section 106 includes a keyboard 110 and a pointing device 112 exposed in a top side 114 of a housing 116. The computer system 100 also preferably includes optional speakers 117 in any appropriate location, such as exposed on the top side 114 of the housing 116, as shown. The base section 106 also preferably includes most of the electronic components of the computer system 100.

The multi-functional device 102 has a housing 118 (FIG. 2) adapted to be inserted at least partially inside a device bay 119 in the base section 106, as shown in the configuration of FIG. 1. In this configuration, content (e.g. audio, video, images, games, etc.) is transferred between the multi-functional device 102 and the computer system 100. For example, entertainment content may be played from the multi-functional device 102 through the computer system 100 at the display screen 108 and/or the speakers 117. Alternatively, the entertainment content may be uploaded from the multi-functional device 102 to the computer system 100 or downloaded from the computer system 100 to the multi-functional device 102 for immediate or later usage.

Figure 2:
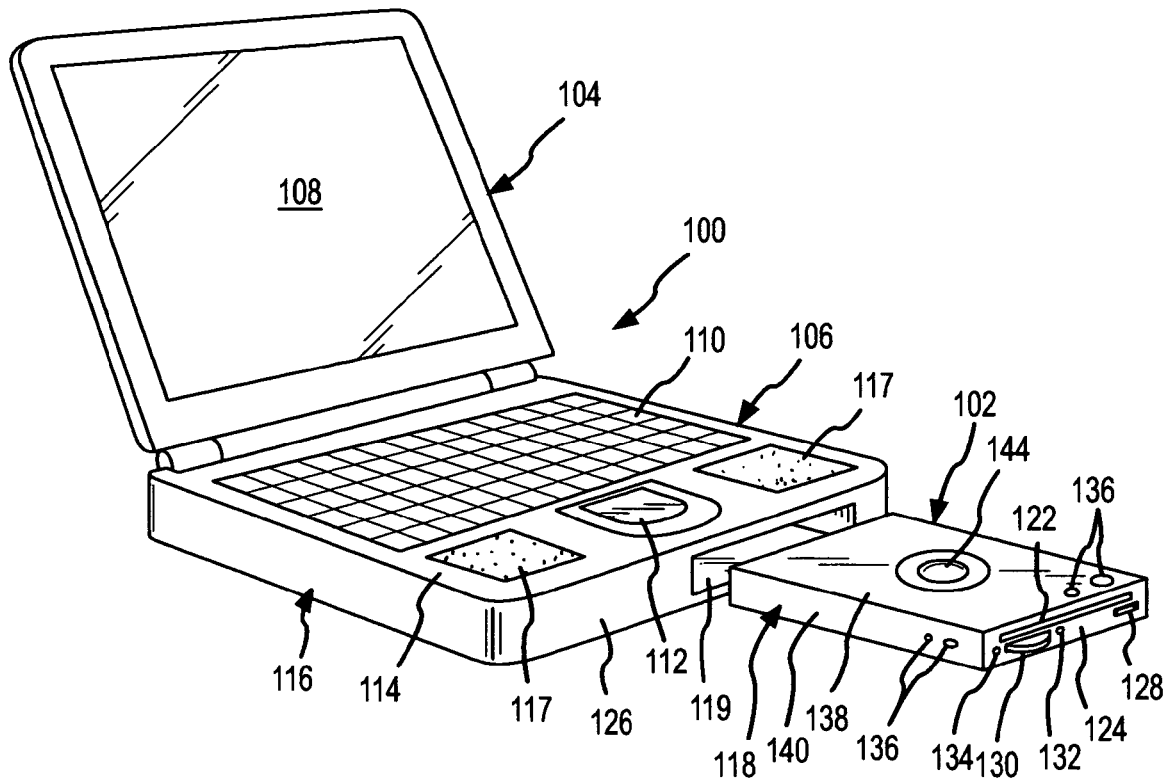
FIG. 2 is another perspective view of the computer system and the multi-functional device shown in FIG. 1.

The multi-functional device 102 can also be removed from the device bay 119 of the computer system 100, as shown in the configuration of FIG. 2. In this configuration, the content is created (e.g. for a video recorder, audio recorder, camera, etc.) and/or played (e.g. for a video player, audio player, game player, etc.) by the multi-functional device 102.

In the multi-functional device 102, the content may be stored on a fixed storage media (such as a hard drive or the like) or a removable storage media 120 (such as a CD, a DVD, a tape, a Compact Flash™, a SanDisk™, a SmartMedia™, etc.). The removable storage media 120 can be inserted into the multi-functional device 102 through a storage media aperture 122 in a front side 124 of the multi-functional device 102. The front side 124 is preferably exposed from a side 126 of the housing 116 of the base section 106 when the multi-functional device 102 is in the base section 106, so the storage media aperture 122 is accessible in this configuration.

Figure 3:
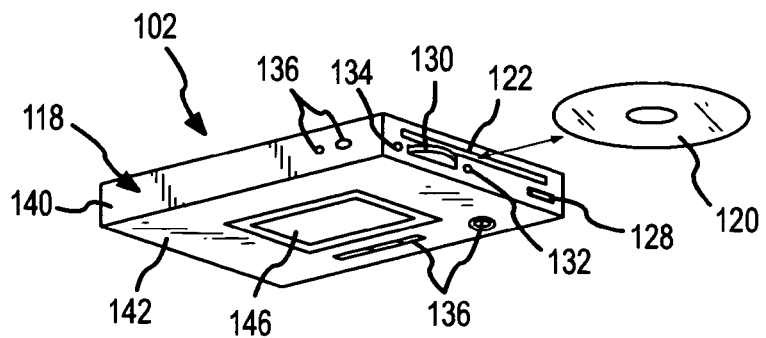
FIG. 3 is another perspective view of the multi-functional device shown in FIG. 1.

The multi-functional device 102 preferably has various optional control/interface elements exposed on the front side 124, such as an eject button 128, a volume control dial 130, an LED indicator 132 and a headphone jack 134. The multi-functional device 102 also preferably has additional optional control/interface elements 136 (FIGS. 2 and 3) exposed on other sides 138, 140 and 142 of the housing 118 that are not accessible when the multi-functional device 102 is in the device bay 119, but only accessible when the multi-functional device 102 is outside of the computer system 100. The control/interface elements 128-134 on the front side 124 are preferably those that a user may need to access whether the multi-functional device 102 is in or out of the computer system 100. For instance, the user may need to eject the removable storage media 120 out through the storage media aperture 122 by pressing the eject button 128 at any time, whether using the multi-functional device 102 as a stand-alone device or as a peripheral device in the computer system 100. Additionally, the user may need to adjust the volume of audio played by the computer system 100 or the multi-functional device 102 by turning the volume control dial 130, bypassing any volume control features of the computer system 100. Furthermore, the LED indicator 132 signifies to the user whether the storage media is being accessed at any time. Additionally, the user may insert a plug for headphones into the headphone jack 134 when listening to audio entertainment content through the multi-functional device 102 or the computer system 100, bypassing the speakers 117.

The additional control/interface elements 136 are preferably those that a user may need to access only when the multi-functional device 102 is out of the computer system 100 and serving as a stand-alone device. For a video or still-image camera, for example, a camera lens 144 and a view finder 146 are not useable when the multi-functional device 102 is inside the computer system 100, so any control/interface elements 136 used to cause the multi-functional device 102 to record or view video or images are not needed in the configuration shown in FIG. 1. Likewise, for a video player, the control/interface elements 136 for typical functions, such as play, pause, stop, fast forward and reverse, need to be accessible only when the multi-functional device 102 is out of the computer system 100, since the computer system 100 typically already has such capabilities that the user can utilize when the multi-functional device 102 is inside the computer system 100.

Figure 4:
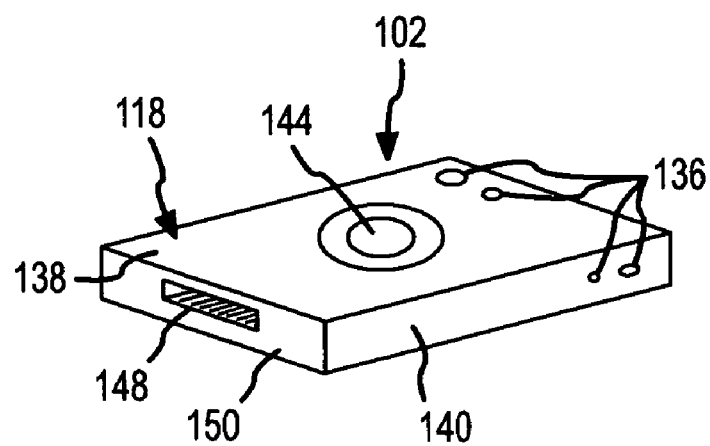
FIG. 4 is yet another perspective view of the multi-functional device shown in FIG. 1.
Figure 5:
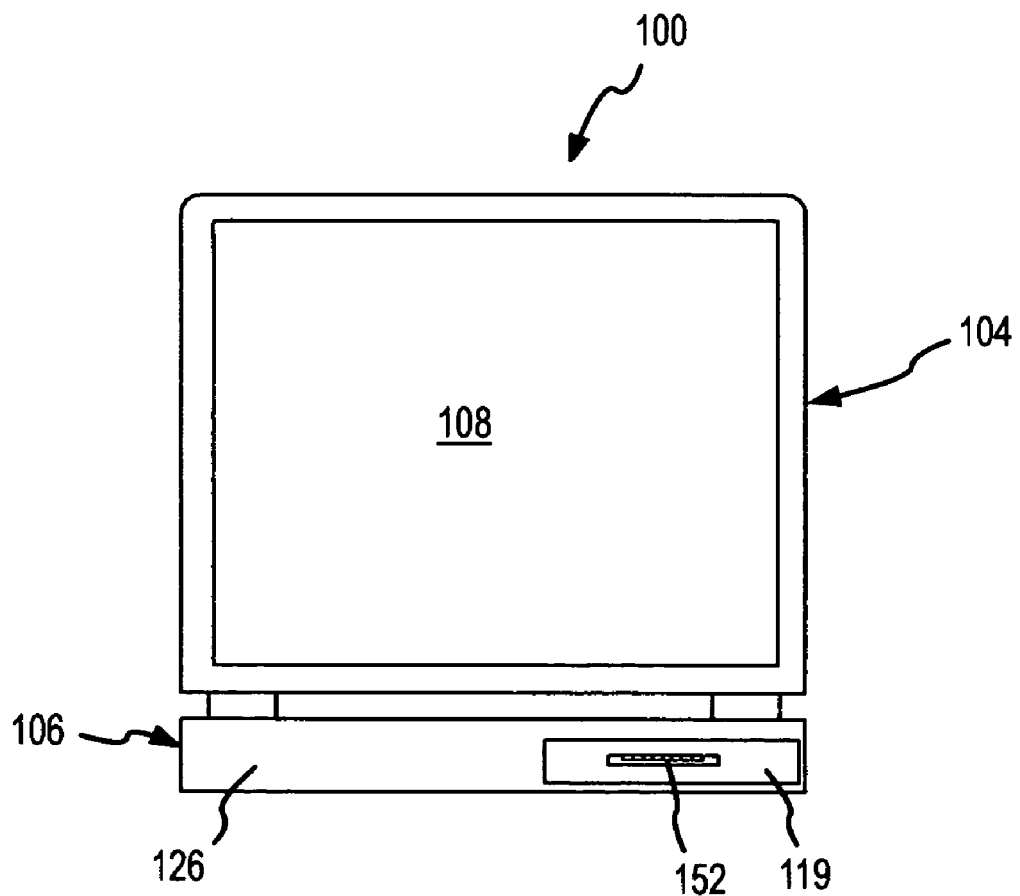
FIG. 5 is a front view of the computer system shown in FIG. 1.

The multi-functional device 102 also preferably has an electrical connector 148 disposed on a back side 150 of the housing 118, as shown in FIG. 4. The electrical connector 148 mates with another electrical connector 152 disposed within the bay 119, as shown in FIG. 5, when the multi-functional device 102 is inserted into the computer system 100 to form an electrical connection between the multi-functional device 102 and the computer system 100 through which control signals and the content pass.

Figure 6:
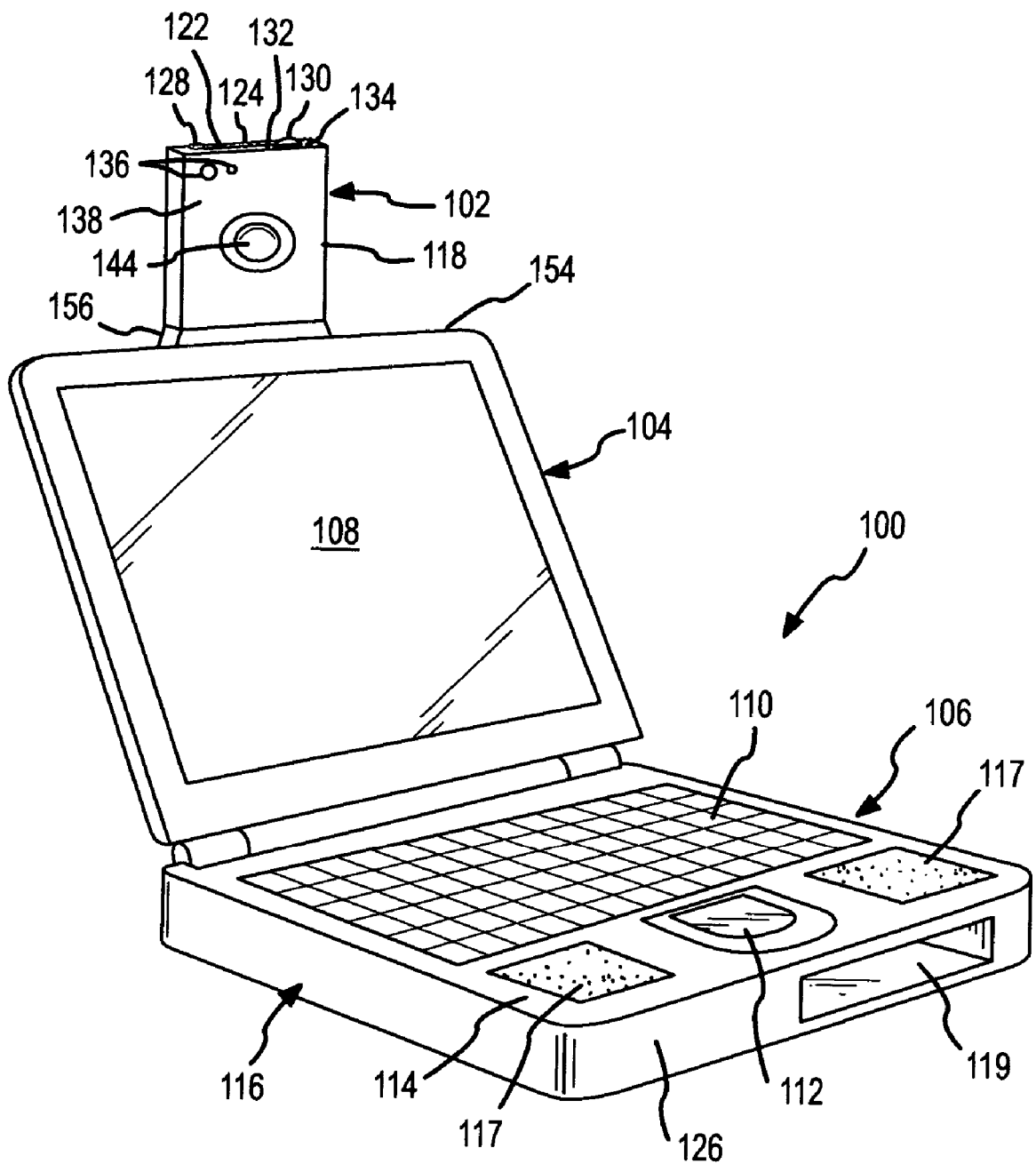
FIG. 6 is another perspective view of the computer system and the multi-functional device shown in FIG. 1 in another configuration.
Figure 7:
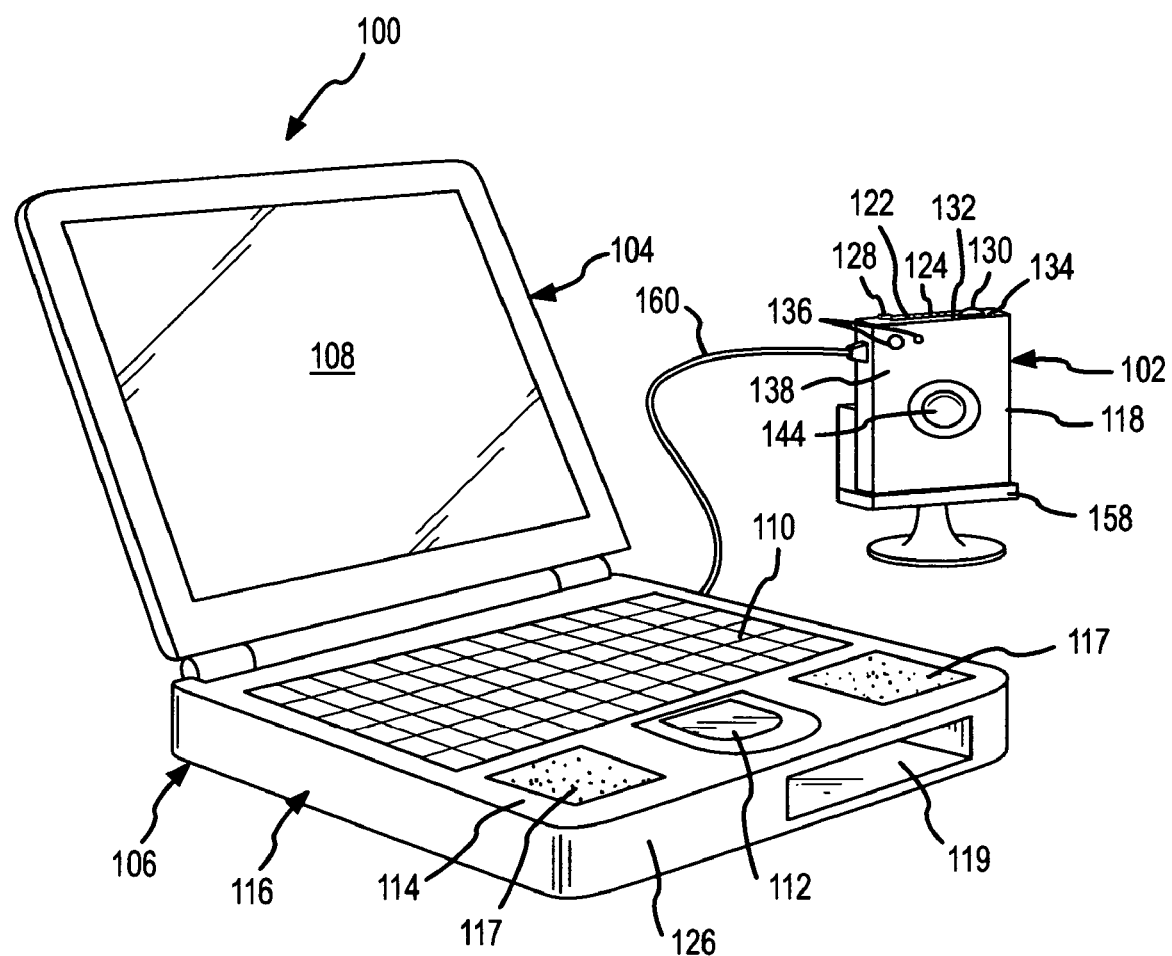
FIG. 7 is another perspective view of the computer system and the multi-functional device shown in FIG. 1 in yet another configuration.

In alternative exemplary configurations, as shown in FIGS. 6 and 7, the multi-functional device 102 connects to the computer system 100 in a manner that enables usage of features that are inaccessible when the multi-functional device 102 is inside the computer system 100. In the configuration shown in FIG. 6, for example, the multi-functional device 102 is mounted on an edge 154 of the display section 104 of the computer system 100. The electrical connector 148 (FIG. 4) is physically connected to the computer system 100 either directly to a mating electrical connector on the edge 154 or indirectly via an adapter 156. Alternatively, the multi-functional device 102 is electrically connected to the computer system 100 via some other means, such as a cable connection or wireless link, and the adapter 156 provides only a physical support for the multi-functional device 102. The adapter 156 may also preferably enable directional positioning of the multi-functional device 102.

In the configuration shown in FIG. 7, for example, the multi-functional device 102 is mounted on a cradle 158 separate from the computer system 100. The multi-functional device 102 is preferably electrically connected to the computer system 100 by any appropriate means, such as a wireless link or a physical cable 160, as shown.

In either of these alternative exemplary configurations, the multi-functional device 102, as a video camera, is conveniently used for video conferencing through the computer system 100. However, the user does not have to carry a separate video camera in addition to the computer system 100, since the multi-functional device 102 may normally be carried inside the computer system 100. Additionally, the ability to use the wireless link or the physical cable 160 also enables the multi-functional device 102 to connect to any other compatible device, such as a printer, an entertainment device, etc., without requiring the other device to have a bay for the multi-functional device 102.

Figure 8:
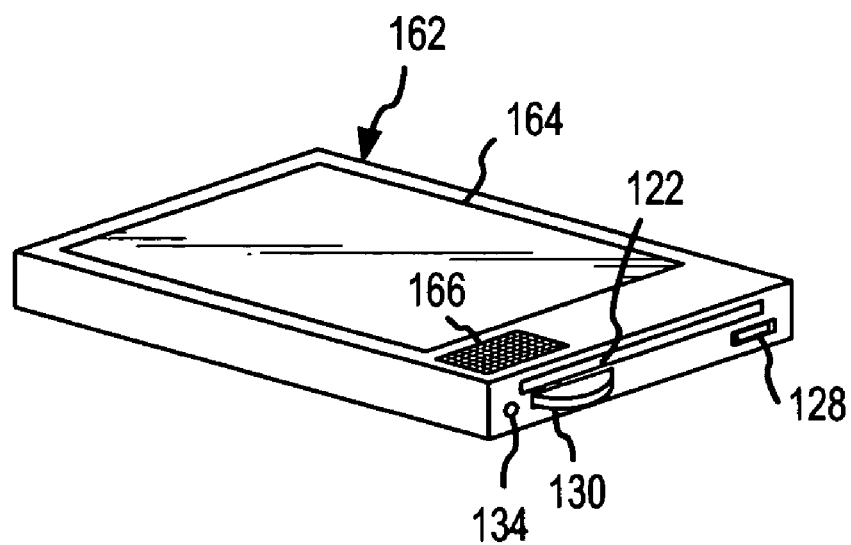
FIGS. 8-17 are perspective views of alternative multi-functional devices incorporating various other embodiments of the present invention.

In an alternative embodiment, as shown in FIG. 8, a multi-functional device 162 may comprise a video player or a DVD player. In this embodiment, the multi-functional device 162 preferably includes a display screen 164 on which to display the video. The multi-functional device 162 may also include an optional speaker 166, in addition to or instead of the headphone jack 134. Additionally, as a DVD player, the multi-functional device 162 preferably includes the storage media aperture 122 (and eject button 128) through which a DVD disk containing video content is inserted. As a generalized video player, on the other hand, the multi-functional device 162 may receive the video content from the computer system 100 (FIGS. 1 and 2) and may include any appropriate device on which to store the video content, such as an internal storage device (e.g. a fixed hard drive, a nonvolatile solid state device, etc.) or a recordable removable storage media (e.g. a DVD-RW, DVD+RW or DVD-R disk, etc.), so the storage media aperture 122 may be optional in this case. When the multi-functional device 162 of this embodiment is inserted in the computer system 100, the multi-functional device 162 may receive the video content from the computer system 100 and store the video content, or the multi-functional device 162 may transfer the video content to the computer system 100 for display through the computer system 100. When the multi-functional device 162 of this embodiment is removed from the computer system 100, the multi-functional device 162 may play the video content on the display screen 164.

Figure 9:
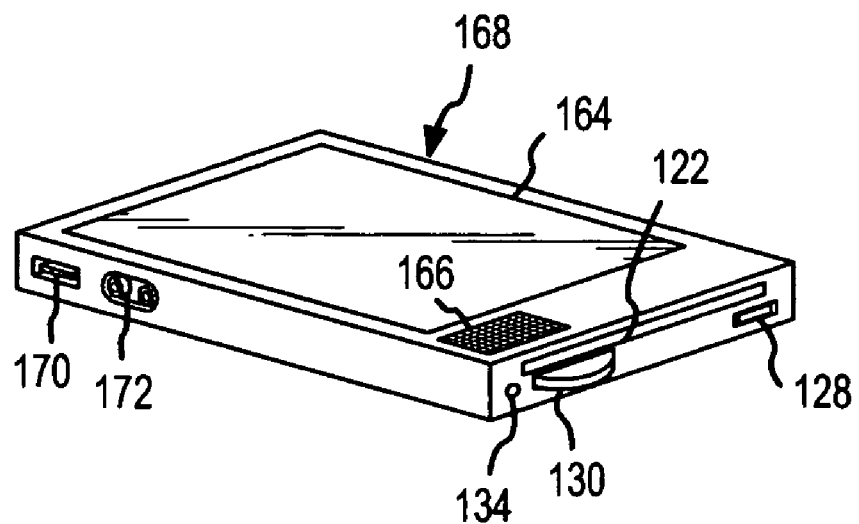

In another alternative embodiment, as shown in FIG. 9, a multi-functional device 168 may comprise a video recorder for capturing video content from a video source while the video content, such as a television program, is being played. In this embodiment, the multi-functional device 168 preferably includes the display screen 164, the headphone jack 134, the volume control dial 130 and the optional speaker 166, so a user can monitor the video content being recorded. Additionally, the multi-functional device 168 preferably includes one or more recessed video input ports 170 and 172 for connecting to the video source, such as a television, a cable TV decoder box, a satellite TV receiver, a video player, etc. The presence of the storage media aperture 122 (and eject button 128) depends on whether the multi-functional device 168 is to store the video content on an internal storage device only for playback by the multi-functional device 168, or is to store the video content on recordable removable storage media for playback by another device. When the multi-functional device 168 of this embodiment is inserted in the computer system 100, the multi-functional device 168 may record the video content from the computer system 100 or transfer previously-recorded video content to the computer system 100. When the multi-functional device 168 of this embodiment is removed from the computer system 100, the multi-functional device 168 may record the video content from any appropriate video source that can connect to any of the video input ports 170 and 172.

Figure 10:
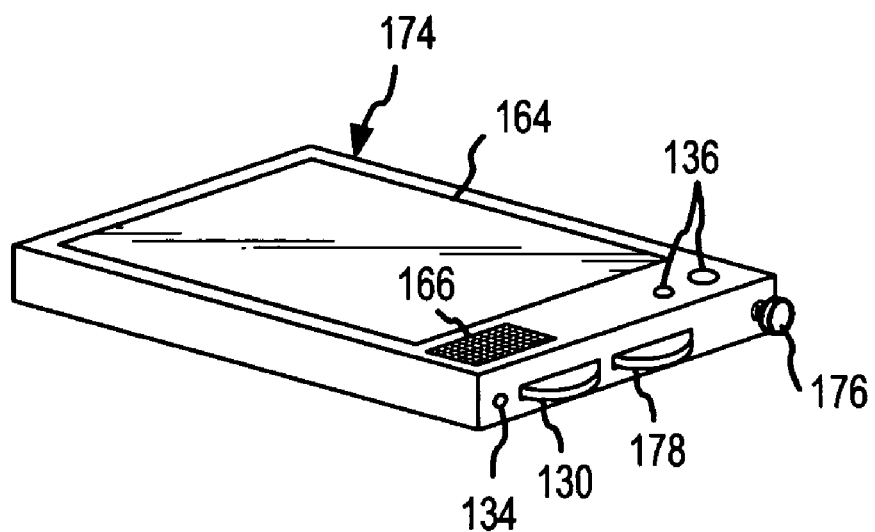

In another alternative embodiment, as shown in FIG. 10, a multi-functional device 174 may comprise a television for viewing broadcast television video content. In this embodiment, the multi-functional device 174 preferably includes the headphone jack 134, the volume control dial 130, the display screen 164 and the optional speaker 166. Additionally, the multi-functional device 174 also preferably includes an antenna 176 and a TV tuner knob 178. Alternatively, instead of the TV tuner knob 178, which is typically an analog device, the control/interface elements 136 may be used for digital tuning of the multi-functional device 174. When the multi-functional device 174 of this embodiment is inserted in the computer system 100, the multi-functional device 174 may play the television video content through the computer system 100. When the multi-functional device 174 of this embodiment is removed from the computer system 100, the multi-functional device 174 may display the television video content on the display screen 164.

Figure 11:
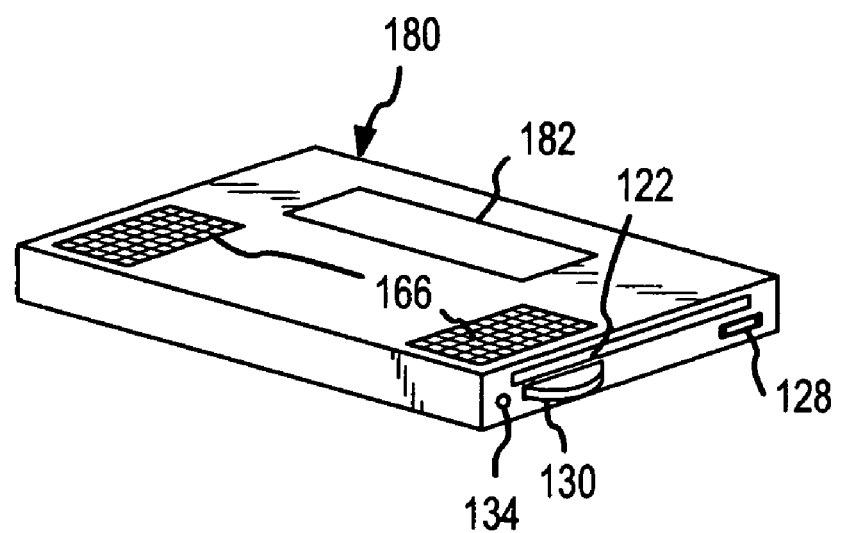

In another alternative embodiment, as shown in FIG. 11, a multi-functional device 180 may comprise an audio player, a CD player or an MP3 player for playing audio content. In this embodiment, the multi-functional device 180 preferably includes the headphone jack 134, the volume control dial 130, one or more of the optional speaker 166 and a display 182 for viewing feedback regarding the audio content. As a CD player, the multi-functional device 180 includes the storage media aperture 122 for insertion of CDs. As an MP3 player, however, the storage media aperture 122 may be optional, since the audio content may be stored either on an internal fixed storage device or on a removable storage media. When the multi-functional device 180 of this embodiment is inserted in the computer system 100, the multi-functional device 180 may play the audio content through the computer system 100 or receive the audio content from the computer system 100 for later playing. When the multi-functional device 180 of this embodiment is removed from the computer system 100, the multi-functional device 180 may play the audio content through either the optional speakers 166 or the headphone jack 134.

Figure 12:
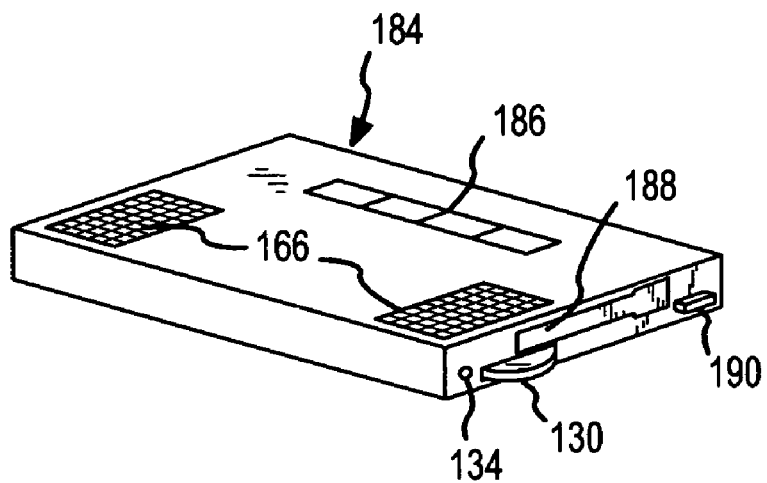

In another alternative embodiment, as shown in FIG. 12, a multi-functional device 184 may comprise an audio tape player for playing audio content from an audio tape. In this embodiment, the multi-functional device 184 preferably includes the headphone jack 134, the volume control dial 130, one or more of the optional speaker 166, control buttons 186 (e.g. for play, stop, fast forward and reverse), a tape access aperture 188 and a tape eject button 190. When the multi-functional device 184 of this embodiment is inserted in the computer system 100, the multi-functional device 184 may play the audio content through the computer system 100. When the multi-functional device 184 of this embodiment is removed from the computer system 100, the multi-functional device 184 may play the audio content through either the optional speakers 166 or the headphone jack 134.

Figure 13:
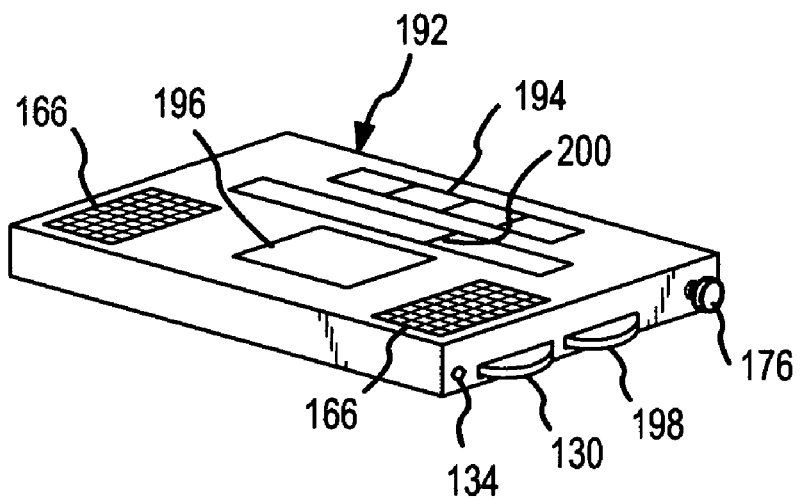

In another alternative embodiment, as shown in FIG. 13, a multi-functional device 192 may comprise an AM, FM or XM radio for playing broadcast radio audio content. In this embodiment, the multi-functional device 192 preferably includes one or more of the optional speaker 166, the headphone jack 134, the volume control dial 130, the antenna 176 and either control buttons 194 for digital radio tuning with a digital display 196 or an analog tuner knob 198 for analog tuning with an analog sliding frequency indicator 200. When the multi-functional device 192 of this embodiment is inserted in the computer system 100, the multi-functional device 192 may play the broadcast audio content through the computer system 100. When the multi-functional device 192 of this embodiment is removed from the computer system 100, the multi-functional device 192 may play the broadcast audio content through either the optional speakers 166 or the headphone jack 134.

Figure 14:
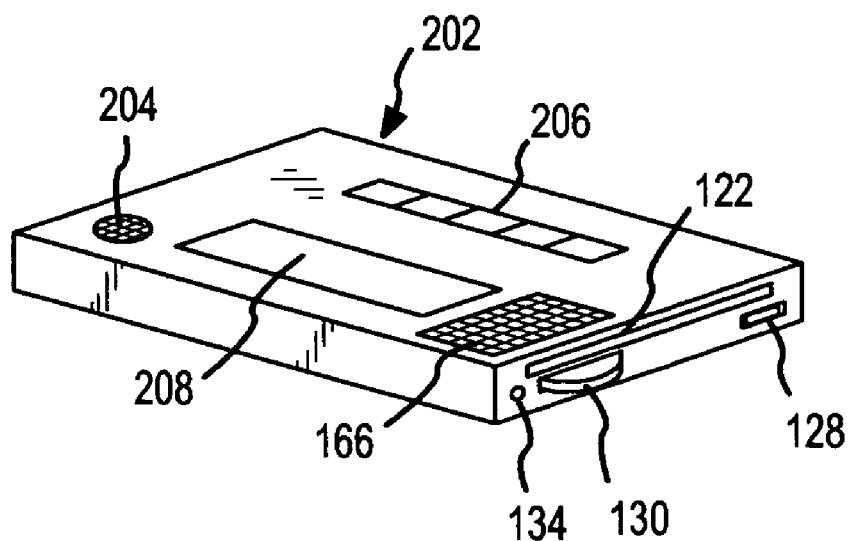

In another alternative embodiment, as shown in FIG. 14, a multi-functional device 202 may comprise an audio recorder for recording audio content. In this embodiment, the multi-functional device 202 preferably includes one or more of the optional speakers 166, the headphone jack 134, the volume control dial 130 and the storage media aperture 122. The storage media aperture 122 may be optional, since the audio content may be recorded on either an internal fixed storage media or a removable storage media. The multi-functional device 202 also preferably includes a microphone 204 for receiving the audio content, control buttons 206 for record/play/fast forward/rewind/stop controls and a display 208 for indicating status. When the multi-functional device 202 of this embodiment is inserted in the computer system 100, the multi-functional device 202 may play the audio content through the computer system 100 or record the audio content using a microphone of the computer system 100. When the multi-functional device 202 of this embodiment is removed from the computer system 100, the multi-functional device 202 may either play the audio content through the optional speaker 166 or the headphone jack 134 or record the audio content through the microphone 204.

Figure 15:
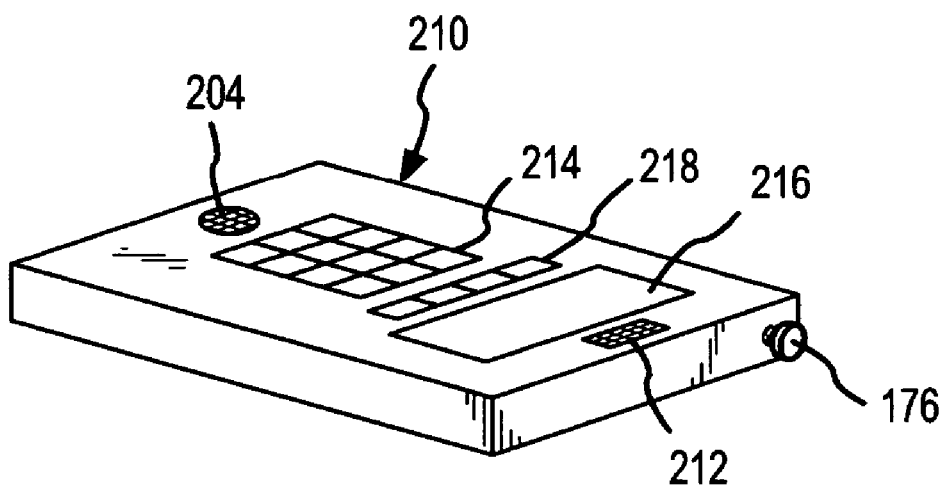

In another alternative embodiment, as shown in FIG. 15, a multi-functional device 210 may comprise a cordless or cell phone for making phone calls (or other wireless communication device for wirelessly transferring information). In this embodiment, the multi-functional device 202 preferably includes the microphone 204, a speaker 212, a phone keypad 214, a display screen 216, other control/menu buttons 218 and the antenna 176. When the multi-functional device 210 of this embodiment is inserted in the computer system 100, the multi-functional device 210 may provide a wireless phone link for the computer system 100. When the multi-functional device 210 of this embodiment is removed from the computer system 100, the multi-functional device 210 serves as a stand-alone cordless or cell phone.

Figure 16:
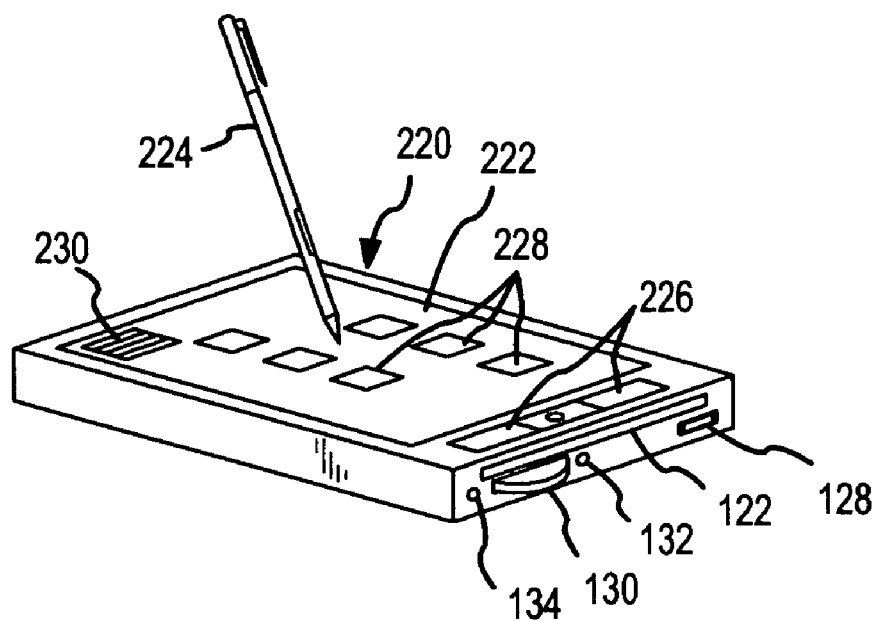

In another alternative embodiment, as shown in FIG. 16, a multi-functional device 220 may comprise a small tablet computer or PDA. In this embodiment, the multi-functional device 220 preferably includes a touch screen 222, a writing stylus 224 and various control buttons 226. The multi-functional device 220 also preferably includes an internal storage device in addition to or instead of a removable storage media. Thus, the storage media aperture 122, the eject button 128, the volume control dial 130, the LED indicator 132 and the headphone jack 134 may be optional, depending on whether the multi-functional device 220 uses the removable storage media. When the multi-functional device 220 of this embodiment is inserted in the computer system 100, the multi-functional device 220 may serve as a general purpose storage device for the computer system 100 and may exchange files and information (such as entertainment content, software, data, etc.) with the computer system 100. When the multi-functional device 220 of this embodiment is removed from the computer system 100, the multi-functional device 220 serves as a stand-alone tablet computer or PDA with which the user interacts via the touch screen 222 (e.g. with the writing stylus 224 and various screen icons 228 and menus 230) and the control buttons 226.

Figure 17:
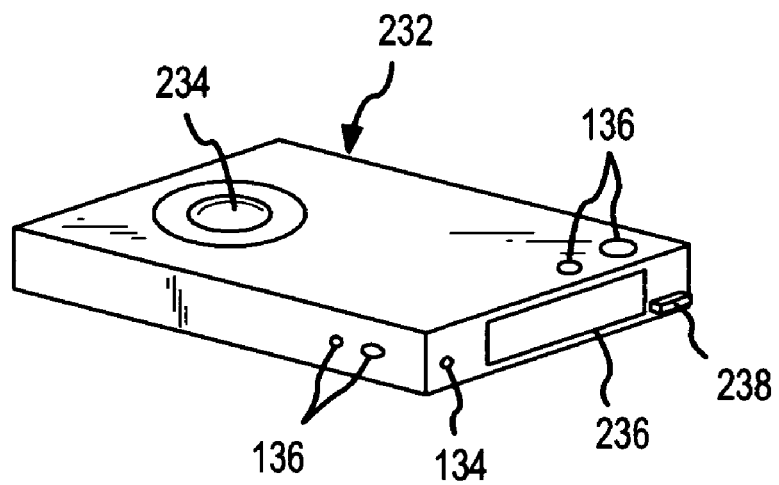

In another alternative embodiment, as shown in FIG. 17, a multi-functional device 232 may comprise a tape-based digital camcorder for recording audio/video content on a digital tape. In this embodiment, the multi-functional device 232 preferably includes the lens 234, a tape aperture 236, a tape eject button 238, the control/interface elements 136 and the headphone jack 134. The multi-functional device 232 also preferably includes a view finder similar to the view finder 146 shown in FIG. 3. When the multi-functional device 232 of this embodiment is inserted in the computer system 100, the multi-functional device 232 may exchange audio/video content with the computer system 100 and may also serve as a general purpose storage device or tape backup device for the computer system 100. When the multi-functional device 232 of this embodiment is removed from the computer system 100, the multi-functional device 232 serves as a stand-alone tape-based digital camcorder, which the user operates via the control/interface elements 136.

The embodiments described herein are exemplary only. Other multi-functional devices may also fall within the scope of the invention, each multi-functional device generally having one set of functions when inserted in the computer system 100 and a second set of functions, in some cases overlapping the first set of functions, when removed from the computer system. For those embodiments that include a form of storage, the multi-functional devices may also serve as general-purpose file storage devices, or multi-functional storage drives, for the computer system 100 into which the multi-functional devices are inserted. Additionally, functions ascribed to different embodiments may be combined in a single multi-functional device.

We claim:

1. A computer, comprising:
    an internal device bay with an electrical connector disposed therein; and
    a multifunctional device insertable in the internal device bay and connectable to the electrical connector;
    and wherein:
    the multi-functional device has a first set of functions when the multi-functional device is inserted into the internal device bay and connected to the electrical connector and a second set of functions when removed from the internal device bay; and
    the multi functional device comprises at least one of a still image camera, a video camera, a video recorder, a digital camcorder, a television, and a radio.

2. A computer, comprising:
    an internal device bay with an electrical connector disposed therein; and
    a multi-functional device insertable in the internal device bay and connectable to the electrical connector;
    and wherein:
    the multifunctional device has a first set of functions when the multi-functional device is inserted into the internal device bay and connected to the electrical connector and a second set of functions when removed from the internal device bay;
    when the multi-functional device is inserted into the internal device bay and connected to the electrical connector, the multifunctional device has a side that is accessible externally of the computer in accordance with at least part of the first set of functions;
    interface elements are exposed on the externally accessible side for controlling functions of the multi functional device (1) when the multifunctional device is inserted into the internal device bay and (2) when the multi-functional device is removed from the internal device bay; and
    the interface elements comprise at least one of a volume control dial, a headphone jack and a tuner knob.

3. A multi-functional device that can be connected to a personal electronic system internal device bay and an electrical connector accessible within the internal device bay, comprising:
    a body insertable at least partially into the internal device bay of the personal electronic system;
    a mating electrical connector adapted to connect to the electrical connector of the personal electronic system upon inserting the multifunctional device into the internal device bay; and
    at least one of a still capturing device, a video image capturing device, a television and a radio;
    and wherein:
    the multi-functional device operates in a first functional capacity when inserted at least partially into the internal device bay and connected to the electrical connector; and
    the multi-functional device operates in a second functional capacity when removed from the personal electronic system.

4. A method for using a multi functional device, comprising:
    electrically connecting the multi-functional device to a personal electronic system by inserting the multi-functional device at least partially into an internal device bay of the personal electronic system;
operating the multi-functional device in a first functional capacity when the multifunctional device is inserted in the internal device bay of the personal electronic system;
electrically disconnecting the device from the personal electronic system by removing the device from the internal device bay of the personal electronic system; and
operating the multifunctional device in a second functional capacity when the multi-functional device is removed from the personal electronic system;
and wherein:
the multi-functional device comprises at least one device for capturing digital still images, digital video, a television, and a radio.

5. A computer, comprising:
a display screen;
an internal device bay with an electrical connector disposed therein; and
a camera insertable in and at least partially fully enclosed within the internal device hay and connectable to the electrical connector and having a camera lens;
and wherein:
the camera has a first set of functions when the camera is inserted into the internal device bay and connected to the electrical connector and a second set of functions when removed from the internal device bay;
the first set of functions includes transferring captured image content to the computer; and
the second set of functions includes capturing image content through the camera lens.

6. A computer as defined in claim 5, wherein the camera comprises a still image camera.

7. A computer as defined in claim 5, wherein the camera comprises a video camera.

8. A computer as defined in claim 5, wherein the camera comprises a digital camcorder.

9. A computer, comprising:
a display screen;
an internal device bay with an electrical connector disposed therein; and
a video device insertable in and at least partially fully enclosed within the internal device bay and connectable to the electrical connector and having a display screen;
and wherein:
the video device has a first set of functions when the video device is inserted into the internal device bay and connected to the electrical connector and a second set of functions when removed from the internal device bay;
the first set of functions includes playing video content through the display screen of the computer; and
the second set of functions includes playing the video content through the display screen of the video device.

10. A computer as defined in claim 9, wherein the video device comprises a DVD player and a storage media aperture through which a DVD disk containing the video content can he inserted into the DVD player.

11. A computer as defined in claim 9, wherein:
the video device comprises a television;
the first set of functions includes playing televised content through the display screen of the computer; and
the second set of functions includes playing the televised content through the display screen of the video device.

12. A computer, comprising:
a display;
an internal device bay with an electrical connector disposed therein; and
a video capture device insertable in and at least partially fully enclosed within the internal device bay and connectable to the electrical connector arid having a display;
and wherein:
the video capture device has a first set of functions when the video capture device is inserted into the internal device bay and connected to the electrical connector and a second set of functions when removed from the internal device bay;
the first set of functions includes playing video content through the display of the computer; and
the second set of functions includes playing the video content through the display of the video capture device.

13. A camera that can he connected to a personal electronic system having an internal device bay and an electrical connector accessible within the internal device bay, comprising;
a body insertable at least partially into and at least partially fully enclosed within the internal device bay of the personal electronic system;
a mating electrical connector adapted to connect to the electrical connector of the personal electronic system upon inserting the camera into the internal device bay; and
a camera lens;
and wherein;
the camera operates in a first functional capacity when inserted at least partially into the internal device bay and connected to the electrical connector;
the camera operates in a second functional capacity when removed from the personal electronic system;
the first set of functions includes transferring captured image content to the personal electronic system; and
the second set of functions eludes capturing image content through the camera lens.

14. A camera as defined in claim 13, further comprising, a still image camera.

15. A camera as defined in claim 13, further comprising a video camera.

16. A camera as defined in claim 13, further comprising a digital camcorder.

17. A video device that can be connected to a personal electronic system having an internal device bay, an electrical connector accessible within the internal device bay and a display screen, comprising:
a body insertable at least partially into and at least partially fully enclosed within the internal device bay of the personal electronic system;
a mating electrical connector adapted to connect to the electrical connector of the personal electronic system upon inserting: the video device into the internal device bay; and
a display screen;
and wherein:
the video device operates in a first functional capacity when inserted at least partially into the internal device bay and connected to the electrical connector;
the video device operates in a second functional capacity when removed from the personal electronic system;
the first set of functions includes playing video content through the display screen of the personal electronic system; and the second set of functions includes playing the video content throng the display screen of the video device.

18. A video device as defined in claim 17, further comprising:
   a DVD player; and
   a storage media aperture through which a DVD disk containing the video content can be inserted into the DVD player.

19. A video device as defined in claim 17, further comprising:
   a game player;
   and wherein:
   the first set of functions includes playing game content through the display screen of the personal electronic system; and
   the second set of functions includes playing the game content through the display screen of the video device.

20. A video device as defined in claim 17, further comprising:
   a television;
   and wherein:
   the first set of functions includes playing televised content through the display screen of the personal electronic system; and
   the second set of functions includes playing the televised content through the display screen of the video device.

* * * * *

UNITED STATES PATENT AND TRADEMARK OFFICE
CERTIFICATE OF CORRECTION

PATENT NO. : 7,254,015 B2
APPLICATION NO. : 10/758380
DATED : August 7, 2007
INVENTOR(S) : Memphis-Zhihong Yin et al.

It is certified that error appears in the above-identified patent and that said Letters Patent is hereby corrected as shown below:

In column 8, line 9, in Claim 1, delete "multifunctional" and insert -- multi-functional --, therefor.

In column 8, line 17, in Claim 1, delete "multi functional" and insert -- multi-functional --, therefor.

In column 8, line 26, in Claim 2, delete "multifunctional" and insert -- multi-functional --, therefor.

In column 8, line 33, in Claim 2, delete "multifunctional" and insert -- multi-functional --, therefor.

In column 8, lines 37-38, in Claim 2, delete "multi functional" and insert -- multi-functional --, therefor.

In column 8, line 38, in Claim 2, delete "multifunctional" and insert -- multi-functional --, therefor.

In column 8, line 45, in Claim 3, after "system" insert -- having an --.

In column 8, line 52, in Claim 3, delete "multifunctional" and insert -- multi-functional --, therefor.

In column 8, line 54, in Claim 3, after "still" insert -- image --.

In column 8, line 64, in Claim 4, delete "multi functional" and insert -- multi-functional --, therefor.

In column 9, line 4, in Claim 4, delete "multifunctional" and insert -- multi-functional --, therefor.

In column 9, line 11, in Claim 4, delete "multifunctional" and insert -- multi-functional --, therefor.

In column 9, line 61, in Claim 10, delete "he" and insert -- be --, therefor.

In column 10, line 7, in Claim 12, delete "arid" and insert -- and --, therefor.

In column 10, line 19, in Claim 13, delete "he" and insert -- be --, therefor.

UNITED STATES PATENT AND TRADEMARK OFFICE
CERTIFICATE OF CORRECTION

PATENT NO.        : 7,254,015 B2
APPLICATION NO.   : 10/758380
DATED             : August 7, 2007
INVENTOR(S)       : Memphis-Zhihong Yin et al.

It is certified that error appears in the above-identified patent and that said Letters Patent is hereby corrected as shown below:

In column 10, lines 21-22, in Claim 13, delete "comprising;" and
insert -- comprising: --, therefor.

In column 10, line 31, in Claim 13, delete "wherein;" and
insert -- wherein: --, therefor.

In column 10, line 39, in Claim 13, delete "eludes" and insert -- includes --, therefor.

In column 10, line 41, in Claim 14, after "comprising" delete ",".

In column 10, line 56, in Claim 17, after "inserting" delete ":".

In column 11, line 2, in Claim 17, delete "throng" and insert -- through --, therefor.

Signed and Sealed this

Twenty-sixth Day of August, 2008

JON W. DUDAS
*Director of the United States Patent and Trademark Office*